United States Patent

Hsu

(10) Patent No.: US 10,204,506 B2
(45) Date of Patent: Feb. 12, 2019

(54) SOS SIGNAL TRANSMITTING METHOD, AND ELECTRONIC DEVICE USING SAME

(71) Applicant: Chiun Mai Communication Systems, Inc., New Taipei (TW)

(72) Inventor: Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/728,509

(22) Filed: Oct. 10, 2017

(65) Prior Publication Data

US 2018/0108244 A1  Apr. 19, 2018

(30) Foreign Application Priority Data

Oct. 19, 2016  (CN) .......................... 2016 1 0907645

(51) Int. Cl.
| | | |
|---|---|---|
| G08B 25/01 | (2006.01) | |
| H04W 4/90 | (2018.01) | |
| G08B 3/10 | (2006.01) | |
| H04W 4/02 | (2018.01) | |
| H04L 29/06 | (2006.01) | |

(52) U.S. Cl.
CPC ............. *G08B 25/016* (2013.01); *G08B 3/10* (2013.01); *H04L 69/28* (2013.01); *H04W 4/02* (2013.01); *H04W 4/90* (2018.02)

(58) Field of Classification Search
CPC . H04N 2201/0471; H04N 2201/04744; H04N 1/1135; B64C 2201/205; B64C 39/024; H04W 4/22; H04W 76/007; G08B 21/24; G08B 21/0294; G08B 25/016; G08B 21/0492; G08B 21/0469; G01S 19/17; G01S 2205/006; H04M 3/5116; H04M 11/04; H04L 65/4061; A61B 5/11
See application file for complete search history.

(56) References Cited

U.S. PATENT DOCUMENTS

| | | | | |
|---|---|---|---|---|
| 2014/0051379 A1* | 2/2014 | Ganesh | .................... | H04W 4/22 |
| | | | | 455/404.1 |
| 2016/0071418 A1* | 3/2016 | Oshida | ..................... | G08G 1/22 |
| | | | | 701/23 |
| 2017/0144737 A1* | 5/2017 | Erikson | ................... | B63C 11/12 |
| 2017/0171690 A1* | 6/2017 | Kim | ..................... | H04W 4/005 |

(Continued)

FOREIGN PATENT DOCUMENTS

| | | | |
|---|---|---|---|
| CN | 202276379 U | | 6/2012 |
| CN | 203522852 U | | 4/2014 |

(Continued)

OTHER PUBLICATIONS

Wikipedia.*

*Primary Examiner* — Nizar N Sivji
(74) *Attorney, Agent, or Firm* — ScienBiziP, P.C.

(57) ABSTRACT

An SOS signal transmitting method for controlling an electronic device to send an SOS signal. The SOS signal transmitting method includes: detecting a state of an electronic device, the state including at least standby time of the electronic device; determining whether the electronic device needs to enter into an SOS mode; controlling the electronic device to transmit SOS signals if the electronic device enters into the SOS mode. The SOS signals includes at least wireless signals transmitted by the electronic device. An electronic device is also provided.

14 Claims, 3 Drawing Sheets

(56) References Cited

U.S. PATENT DOCUMENTS

2017/0233097 A1* 8/2017 Chang .................. B64C 39/024
                                                         701/3
2017/0372592 A1* 12/2017 Neravati .............. G08B 25/016

FOREIGN PATENT DOCUMENTS

| CN | 103810817 A | 5/2014 |
|----|-------------|--------|
| TW | 424499      | 3/2001 |
| TW | M444463     | 1/2013 |
| TW | M449320     | 3/2013 |

* cited by examiner

SOS SIGNAL TRANSMITTING METHOD, AND ELECTRONIC DEVICE USING SAME

FIELD

The disclosure generally relates to an emergency signaling, or SOS signaling method, system, and electronic device, and particularly to an SOS signal transmitting method, system, and electronic device that sends wireless signals as SOS signals.

BACKGROUND

Electronic devices can have an SOS function for emergency, and obtain user's location by Global Positioning System (GPS) module. Then, the electronic device sends the user's location information by a text message, a voice message, or other methods to default contacts or a designated SOS service provider, so that SOS service can be provided. However, in case of the user's location not being covered by GPS signal and wireless communication network, or the GPS signal and the wireless communication network being interrupted due to external factors such as earthquakes, bad weather, there is a high risk that the SOS message cannot be sent out.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
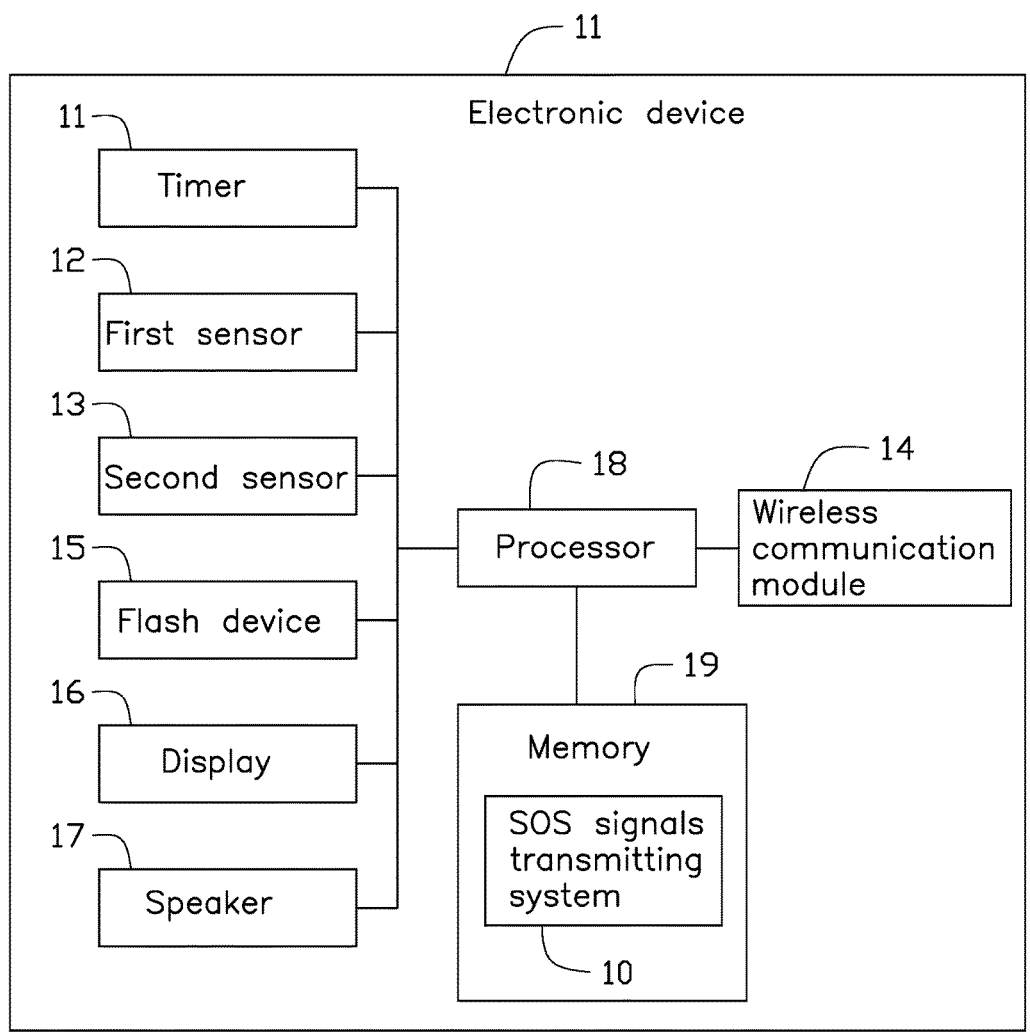
FIG. 1 is a functional block diagram of an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

FIG. 1 shows an SOS signal transmitting system 10 in accordance with an exemplary embodiment. The SOS phrase is widely known as referring to as save our souls, which stands for calling for help. The SOS signal transmitting system 10 is installed and operated in an electronic device 1. The electronic device 1 can be a portable electronic device such as a mobile phone, a PDA (personal digital assistant), a handheld game machine, a digital camera, or a palmtop computer. The SOS signal transmitting system 10 can detect a status of the electronic device 1, and determine whether the electronic device 1 needs to enter into SOS mode according to the status, and can transmit SOS signals if the electronic device 1 enters into the SOS mode.

In this embodiment, the status includes a surrounding brightness of light value, an acceleration value, and a standby time of the electronic device 1. The controlling of the electronic device 1 to transmit SOS signals includes at least one of controlling the electronic device 1 to send a flash of light, controlling the electronic device 1 to power on a screen of the electronic device 1, and controlling the electronic device 1 to send a preset sound. The preset sound includes a high frequency sound and/or a low frequency sound.

The electronic device 1 includes a timer 11, a first sensor 12, a second sensor 13, a wireless communication module 14, a flash device 15, a display 16, a speaker 17, a processor 18, and a memory 19. In this embodiment, the first sensor 12 is a light sensor, configured to detect the brightness of light around the electronic device 1 and generate a brightness value. The second sensor 13 is a movement sensor, configured to detect any movement of the electronic device 1. In one embodiment, the second sensor 13 is a gravity sensor (G-Sensor), configured to detect an acceleration value of the electronic device 1 to determine whether the electronic device 1 is moved or not. The wireless communication module 14 can be a BLUETOOTH module, a WIFI module, or the like, and is configured to send wireless signals. The flash device 15, the display 16, and the speaker 17 are configured to enable the electronic device 1 to send a flash of light, light up the screen, and send the preset sound as SOS signals. The memory 19 can be set in the electronic device 1, and further can be a separate external memory card instead, such as a SM card (Smart Media Card), an SD card (Secure Digital Card) or the like. The memory 19 is configured to store data and programs, such as the SOS signal transmitting system 10. The processor 18 is configured to execute the operating system and various applications in the electronic device 1, such as the SOS signal transmitting system 10.

In at least one embodiment, the memory 19 can include various types of non-transitory computer-readable storage mediums. For example, the memory 19 can be an internal storage system, such as a flash memory, a random access memory (RAM) for temporary storage of information, and/or a read-only memory (ROM) for permanent storage of information. The memory 19 can also be an external storage system, such as a hard disk, a storage card, or a data storage medium. The at least one processor 18 can be a central processing unit (CPU), a microprocessor, or other data processor chip that performs functions of the electronic device 1.

Figure 2:
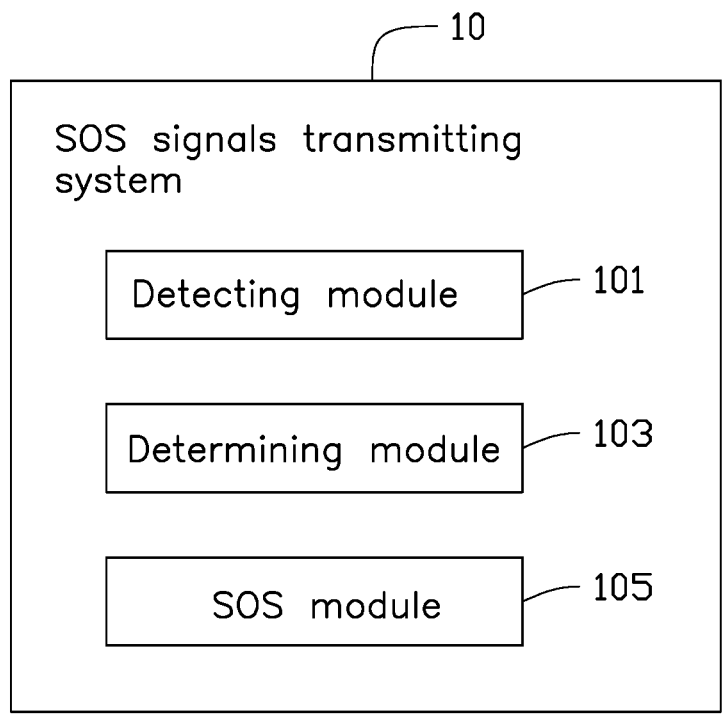
FIG. 2 is a functional block diagram of an exemplary embodiment of SOS signal transmitting system in the device of FIG. 1.
Figure 3:
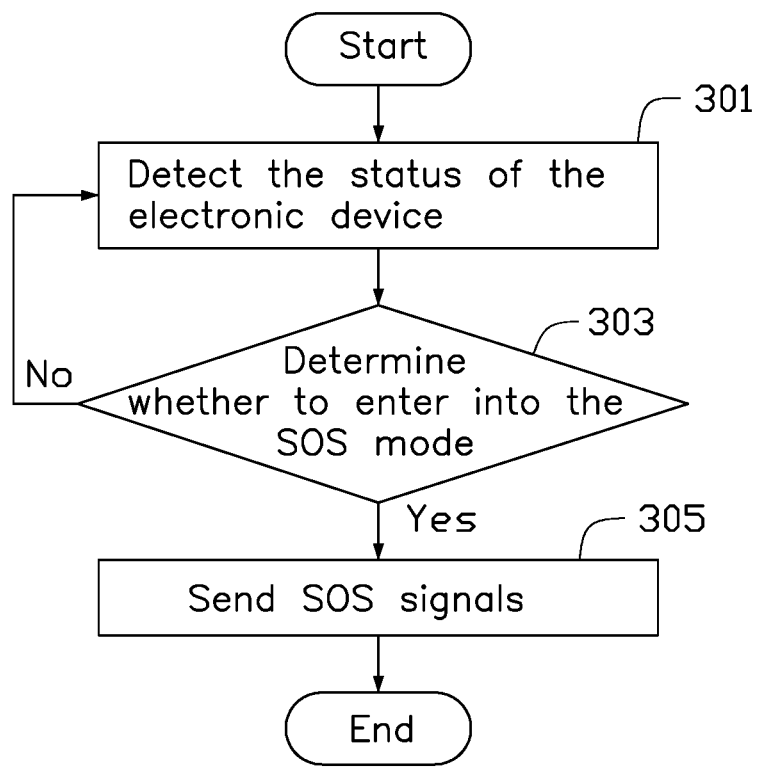
FIG. 3 is a flow diagram of an exemplary embodiment of SOS signal transmitting method.

Referring to FIG. 2, the SOS signals transmitting system 10 includes a detecting module 101, a determining module 103, and an SOS module 105.

The detecting module 101 is configured for detecting the status of the electronic device 1. The status includes at least a standby time of the electronic device 1. The status further includes the surrounding brightness and/or the acceleration value of the electronic device 1. The detecting module 101 can detect the information from the timer 11, the first sensor 12, and the second sensor 13.

The determining module 103 is configured for determining whether the electronic device 1 needs to enter into the SOS mode, according to the detected status. In this embodiment, the determining module 103 compares the detected status with at least one stored reference value and determines whether the electronic device 1 needs to enter into the SOS mode based on the comparison. The reference value is stored in the memory 19.

In a first exemplary embodiment, the status includes the standby time of the electronic device 1. The standby time is a time span. When the standby time is longer than a first reference value, e.g. 24 hours, that is, the electronic device 1 has not been operated by the user for a long time, the user may be in an emergency situation. The determining module 103 can determine that the electronic device 1 needs to enter into the SOS mode.

In a second exemplary embodiment, the status can include a combination of the standby time of the electronic device 1 and the surrounding brightness value of the electronic device 1. When the standby time is longer than the first reference value and the variation of the surrounding brightness value during the standby time is less than a second reference value, eg. 20 lux, the determining module 103 can determine that the electronic device 1 needs to enter into the SOS mode. Alternatively, when the standby time is longer than the first reference value and the surrounding brightness value is less than a third reference value, eg. 10 lux, throughout the standby time, the determining module 103 can determine that the electronic device 1 needs to enter into the SOS mode. That is, the electronic device 1 has not been operated by the user for a long time and is in an environment where the light is dim or unchanging, then the determining module 103 determines that the electronic device 1 needs to enter into the SOS mode.

In a third exemplary embodiment, the status can further include the combination of the standby time of the electronic device 1 and the acceleration value of the electronic device 1. When the standby time is longer than the first reference value and the acceleration value is less than a fourth reference value throughout the standby time, the determining module 103 determines that the electronic device 1 needs to enter into the SOS mode. That is, the electronic device 1 has not been operated by the user for a long time and the position of electronic device 1 does not change significantly during that time, the user may be deemed to be in dangerous situation, and the determining module 103 can determine that the electronic device 1 needs to enter into the SOS mode.

In a fourth exemplary embodiment, the status can include a combination of the standby time of the electronic device 1, the surrounding brightness value of the electronic device, and the acceleration value of the electronic device 1. When the standby time is longer than the first reference value, and the variation of the surrounding brightness value during the standby time is less than the second reference value or the surrounding brightness value is always less than the third reference value throughout the standby time, and the acceleration value is less than the fourth reference value throughout the standby time, the determining module 103 can determine that the electronic device 1 needs to enter into the SOS mode. That is, the electronic device 1 has not been operated by the user for a long time, is in an environment where the light is dim or unchanging, and the position of electronic device 1 does not change significantly. Herein, the determining module 103 can determine that the electronic device 1 needs to enter into the SOS mode.

The SOS module 105 is configured to control the electronic device 1 to send SOS signals when the electronic device enters into the SOS mode. The SOS signals include at least wireless signals transmitted by the wireless communication module 14 of the electronic device 1. An SOS responder can locate the electronic device 1 according to the source of wireless signals and obtain a position information, so as to provide aid to the user of the electronic device 1.

In another exemplary embodiment, the controlling of the electronic device 1 to transmit the SOS signals includes at least one of controlling the electronic device 1 to send a flash of light, controlling the electronic device 1 to power on a screen of the electronic device 1, and controlling the electronic device 1 to send a preset sound.

Referring to FIG. 2, a flowchart of an exemplary embodiment of SOS signal transmitting method is presented. The exemplary method is provided by way of example, as there are a variety of ways to carry out the method. The method described below can be carried out using the configurations illustrated in FIG. 1, for example, and various elements of these figures are referenced in explaining example method. Each block shown in FIG. 2 represents one or more processes, methods, or subroutines, carried out in the exemplary method. Additionally, the illustrated order of blocks is by example only and the order of the blocks can be changed. The exemplary method can begin at block 301. Depending on the embodiment, additional steps can be added, others removed, and the ordering of the steps can be changed.

At block 301, the detecting module 101 detects the status of the electronic device 1, the status includes at least the standby time of the electronic device 1. It is to be understood, the status further includes the surrounding brightness value of the electronic device and/or the acceleration value of the electronic device 1. The detecting module 101 can detect the information from the timer 11, the first sensor 12, and the second sensor 13.

At block 303, the determining module 103 determines whether the electronic device 1 needs to enter into the SOS mode according to the detected status. In this embodiment, the determining module 103 compares the detected status with at least one stored reference value and determines whether the electronic device 1 needs to enter into the SOS mode based on the comparison. When the determining module 103 determines the electronic device 1 needs to enter into the SOS mode, proceeds to block 305. When the determining module 103 determines the electronic device 1 does not need to enter into the SOS mode, return to the block 301.

At block 305, the SOS module 105 controls the electronic device 1 to send SOS signals. The controlling of the electronic device 1 to send the SOS signals includes at least one of controlling the electronic device 1 to send a flash of light, controlling the electronic device 1 to power on a screen of the electronic device 1, and controlling the electronic device 1 to send a preset sound.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An SOS signal transmitting method applied to an electronic device, the SOS signal transmitting method comprising steps of:

detecting a status of the electronic device, and the status comprising at least a standby time of the electronic device;
determining whether the electronic device needs to enter into an SOS mode according to the status; and
controlling the electronic device to transmit SOS signals if the electronic device enters into the SOS mode;
wherein the SOS signals comprises at least wireless signals transmitted by the electronic device;
wherein when the standby time is longer than a first reference value, it is determined that the electronic device needs to enter into the SOS mode; and
wherein the status further comprises a surrounding brightness value of the electronic device, and the step of determining that the electronic device needs to enter into the SOS mode is further based on a conditions that a variation of the surrounding brightness value during the standby time is less than a second reference value.

2. The SOS signal transmitting method of claim 1, wherein the status further comprises a surrounding brightness of the electronic device, and the step of determining that the electronic device needs to enter into the SOS mode is further based on a conditions that the surrounding brightness value is lower than a third reference value throughout the standby time.

3. The SOS signal transmitting method of claim 1, wherein the status further comprises an acceleration value of the electronic device, and the step of determining that the electronic device needs to enter into the SOS mode is further based on a conditions that the acceleration value is less than a fourth reference value throughout the standby time.

4. The SOS signal transmitting method of claim 1, wherein the step of controlling the electronic device to transmit SOS signals comprises at least one of controlling the electronic device to send a flash of light, controlling the electronic device to power on a screen of the electronic device, and controlling the electronic device to send a preset sound.

5. The SOS signal transmitting method of claim 4, wherein the preset sound comprises a high frequency sound and/or a low frequency sound.

6. An electronic device, comprising at least one processor configured for executing a plurality of modules which are collections of instructions, the plurality of modules comprising:
a detecting module, configured for detecting a status of the electronic device, and the status comprising at least a standby time of the electronic device;
a determining module, configured for determining whether the electronic device needs to enter into an SOS mode according to the status; and
an SOS module, configured for controlling the electronic device to transmit SOS signals if the electronic device enters into the SOS mode;
wherein the SOS signals comprises at least wireless signals transmitted by the electronic device;
wherein when the standby time is longer than a first reference value, the determining module determines that the electronic device needs to enter into the SOS mode; and
wherein the status further comprises a surrounding brightness value of the electronic device, and the determining of whether the electronic device needs to enter into the SOS mode is further based on a conditions that a variation of the surrounding brightness value during the standby time is less than a second reference value.

7. The electronic device of claim 6, wherein the status further comprises a surrounding brightness value of the electronic device, and the determining of whether the electronic device needs to enter into the SOS mode is further based on a conditions that the surrounding brightness value is lower than a third reference value throughout the standby time.

8. The electronic device of claim 6, wherein the status further comprises an acceleration value of the electronic device, and the determining of whether the electronic device needs to enter into the SOS mode is further based on a conditions that the acceleration value is less than a fourth reference value throughout the standby time.

9. The electronic device of claim 6, wherein the controlling of the electronic device to transmit SOS signals comprises at least one of controlling the electronic device to send a flash of light, controlling the electronic device to power on a screen of the electronic device, and controlling the electronic device to send a preset sound.

10. A non-transitory storage medium having stored thereon instructions that, when executed by at least one processor of an electronic device, causes the least one processor to execute an SOS signal transmitting method, the SOS signal transmitting method comprising:
detecting a status of the electronic device, and the status comprising at least a standby time of the electronic device;
determining whether the electronic device needs to enter into an SOS mode according to the status; and
controlling the electronic device to transmit SOS signals if the electronic device enters into the SOS mode;
wherein the SOS signals comprises at least wireless signals transmitted by the electronic device;
wherein when the standby time is longer than a first reference value, it is determined that the electronic device needs to enter into the SOS mode; and
wherein the status further comprises a surrounding brightness value of the electronic device, and the step of determining that the electronic device needs to enter into the SOS mode is further based on a conditions that a variation of the surrounding brightness value during the standby time is less than a second reference value.

11. The non-transitory storage medium of claim 10, wherein the status further comprises a surrounding brightness of the electronic device, and the determining of whether the electronic device needs to enter into the SOS mode is further based on a conditions that the surrounding brightness value is lower than a third reference value throughout the standby time.

12. The non-transitory storage medium of claim 10, wherein the status further comprises an acceleration value of the electronic device, and the determining of whether the electronic device needs to enter into the SOS mode is further based on a conditions that the acceleration value is less than a fourth reference value throughout the standby time.

13. The non-transitory storage medium of claim 10, wherein the controlling of the electronic device to transmit SOS signals comprises at least one of controlling the electronic device to send a flash of light, controlling the electronic device to power on a screen of the electronic device, and controlling the electronic device to send a preset sound.

14. The non-transitory storage medium of claim 13, wherein the preset sound comprises a high frequency sound and/or a low frequency sound.

* * * * *